June 25, 1968  B. G. KEMP  3,389,577
CENTRIFUGAL REFRIGERATION MACHINE WITH PLURAL MOTORS
Filed Dec. 30, 1966  3 Sheets-Sheet 1
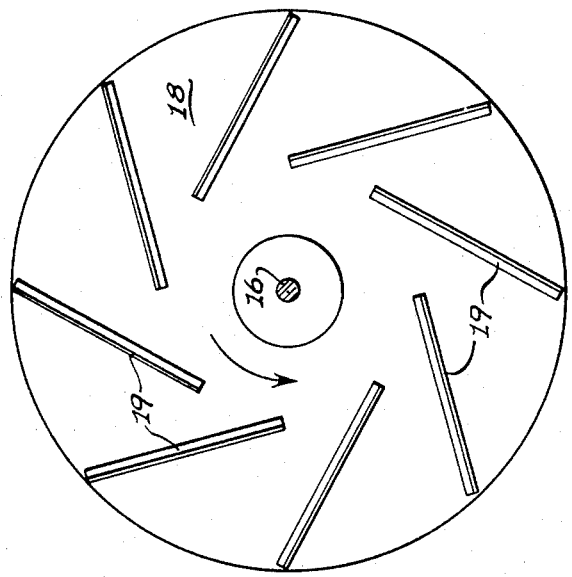
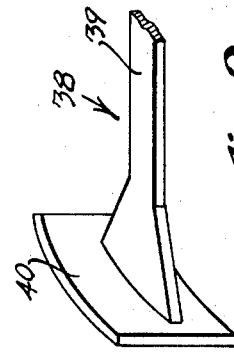
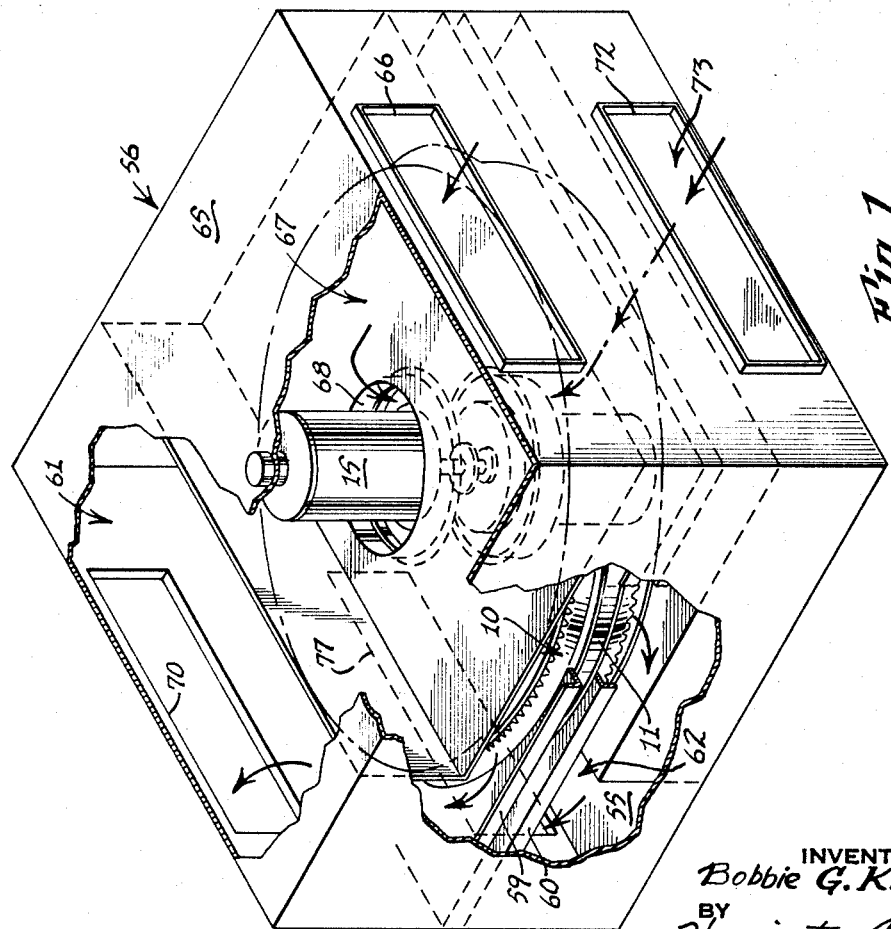
INVENTOR:
Bobbie G. Kemp
BY
Harrington A. Lackey
ATTORNEY June 25, 1968  B. G. KEMP  3,389,577
CENTRIFUGAL REFRIGERATION MACHINE WITH PLURAL MOTORS
Filed Dec. 30, 1966  3 Sheets-Sheet 3

INVENTOR:
Bobbie G. Kemp
BY
Harrington A. Lackey
ATTORNEY

United States Patent Office 3,389,577
Patented June 25, 1968

3,389,577
CENTRIFUGAL REFRIGERATION MACHINE
WITH PLURAL MOTORS
Bobbie G. Kemp, 113 Cumberland Shores Drive,
Hendersonville, Tenn. 37075
Filed Dec. 30, 1966, Ser. No. 606,233
10 Claims. (Cl. 62—499)

ABSTRACT OF THE DISCLOSURE

A refrigeration machine having a rotatable refrigerating housing. A drive motor rotates the housing while a compressor motor fixed upon and rotatable with the housing rotates a centrifugal compressor member within the housing relative to the rotation of the housing.

Background of the invention

This invention relates to a centrifugal refrigeration machine.

Although centrifugal refrigeration machines are known in the art (e.g. U.S. Patent 2,609,672 of Wales, Sept. 9, 1952), nevertheless such machines employ a single electric motor, which is inherently limited in its refrigeration production. The standard output of electrical generating plants in the United States is 60 cycle A.C. Consequently, the speed of the fastest electrical two-pole motor is 3600 r.p.m. Electrical motors having additional poles are proportionately reduced in speed. For example, a four-pole electrical motor has a speed of 1800 r.p.m. Of course, it is possible to increase the output speed of a motor system by employing mechanical accelerating transmissions, such as gears or belts and pulleys, but this increases the cost of the drive system substantially and adds to the overall inefficiency and, of course, heavy wear and replacement on the continually moving parts.

The above Wales patent discloses a single electrical motor rated at 1725 r.p.m. driving a rotary housing including a compressor and condenser chamber and an evaporator chamber in refrigerant communication. Movable compressor blades are mounted on the interior walls of the rotary compressor chamber for moving past stationary blades to compress the gaseous refrigerant. Thus, the compression of refrigerant gas is directly related to the speed of the electric motor. The speed of the electric motor and the refrigerating demands of the system determine the design, and specifically the size of the machine.

Summary of the invention

It is therefore an object of this invention to provide a centrifugal refrigeration machine which will overcome the limitations of prior single-motor machines. This machine incorporates not only an electric motor supplied with the same 60 cycle A.C. standard current for driving a rotary compressor member within a compressor chamber, but also employs a second electric motor for rotating a housing containing the entire refrigerating system and the compressor motor which is mounted on the housing. By driving both motors in the same direction, the speed of the compressor motor member relative to a stationary support is the sum of the speeds of the compressor member and the rotoary housing. Therefore, if both the compressor motor and the housing drive motor are two-pole electric motors with theroretical maximum speeds of 3600 r.p.m., the speed of the compressor relative to the stationary support is 7200 r.p.m., with an attendant relative increase in the compression of the refrigerant.

Consequently, it will be seen that a centrifugal refrigeration machine made in accordance with this invention may be designed and constructed in much smaller sizes to produce the same refrigerating effect as a single-motor centrifugal refrigeration machine.

Other features incorporated in the invention for increasing its performance and efficiency are improved means for transferring the fluid refrigerant between the compressor and condenser sections and the evaporator section of the rotary refrigeration housing, means for accelerating the evaporation of the refrigerant within the evaporator chamber, and efficient heat transfer surfaces between the condenser and the evaporator chambers and their respective mediums in which the housing rotates.

Brief description of the drawing

FIG. 1 is a perspective view, with parts broken away, disclosing the refrigeration machine made in accordance with this invention installed in a plenum housing;

FIG. 3 is a front elevation of the device disclosed in FIG. 1 with the plenum housing and a portion of the rotary housing shown in section along a diametrical vertical plane of the rotary housing;

FIG. 4 is a bottom plan view of the rotary compressor member; and

FIG. 5 is a fragmentary perspective view of one extremity of the slinger member.

Description of the preferred embodiment

Figure 2:
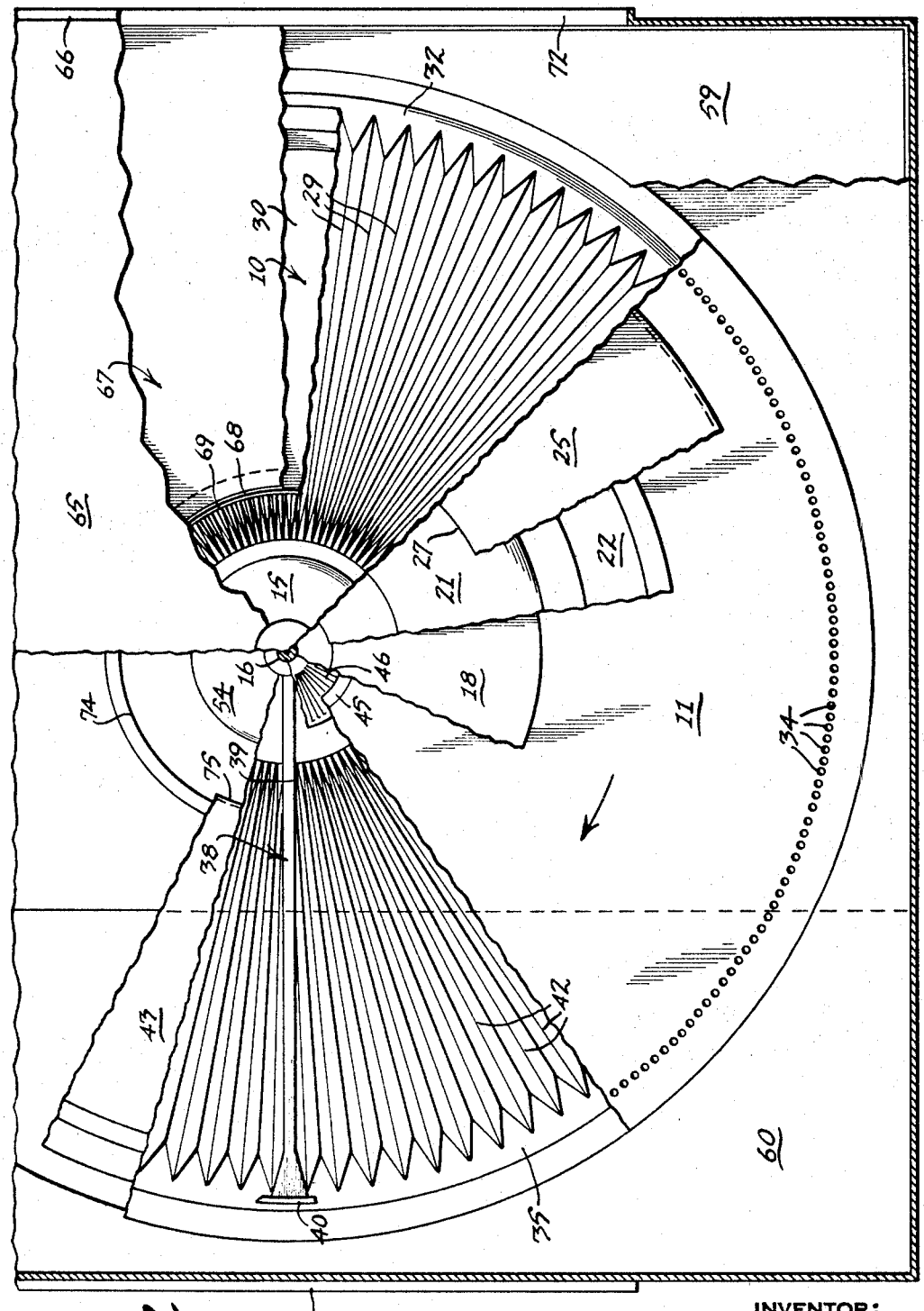
FIG. 2 is an enlarged top plan view of the plenum housing and refrigeration machine disclosed in FIG. 1, with successive elevated layers cut away to disclose the construction of the invention.
Figure 7:
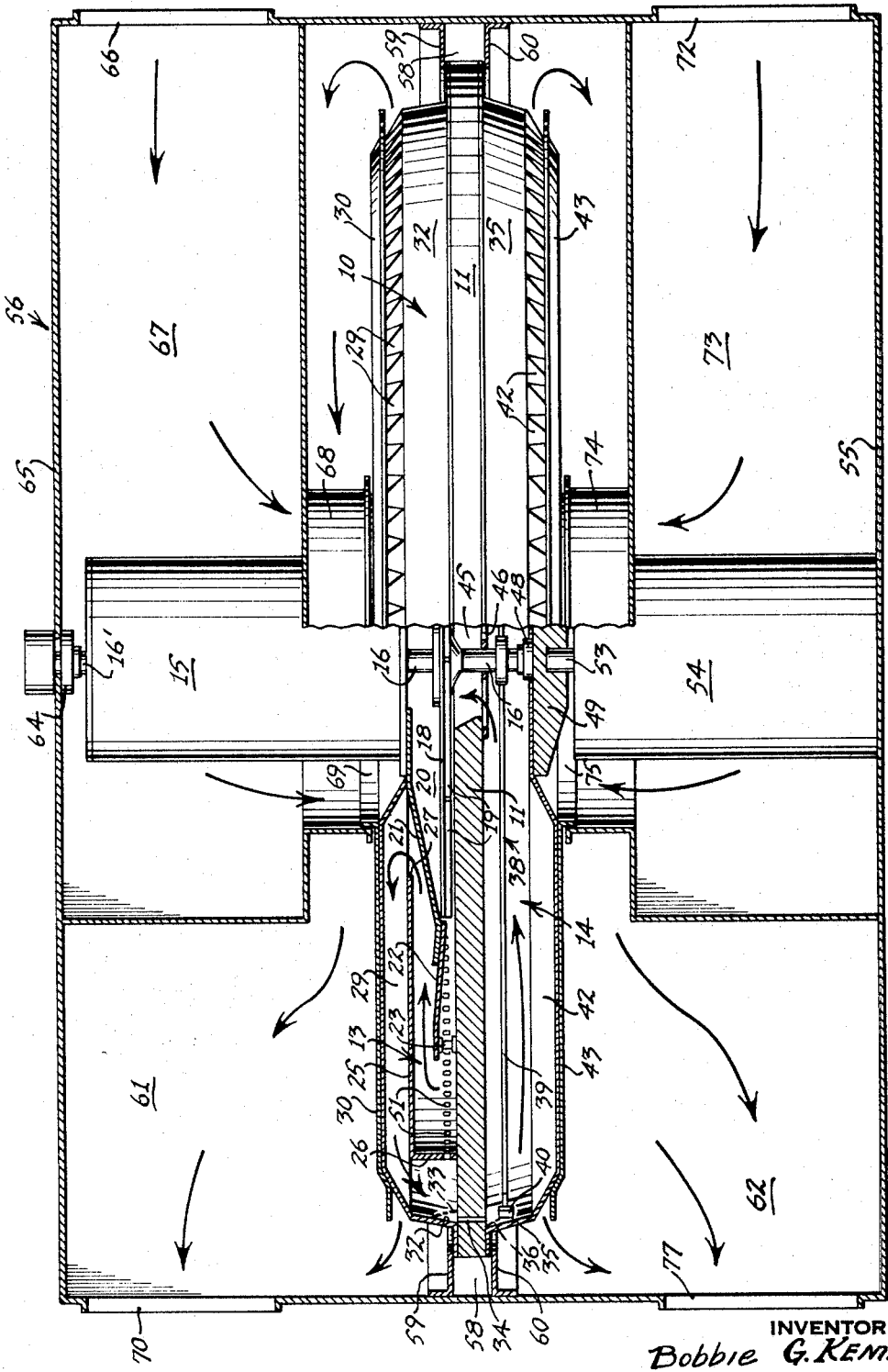

Referring now to the drawings in more detail, the refrigeration machine made in accordance with this invention includes a hermetically sealed, rotary refrigeration housing 10, which is preferably circular. The housing 10 includes a solid, insulated, circular partition wall 11 disposed in a diametrical plane through substantially the middle of the housing 10 in order to divide the housing generally into a compressor-condenser chamber 13 and an evaporator chamber 14.

As disclosed in the drawings, the partition wall 11 is disposed in a substantially horizontal plane so that the compressor-condenser chamber is disposed above the wall 11, while the evaporator chamber 14 is disposed below the wall 11. Although this is the preferred disposition of the housing 10 for reasons which will be brought out later, nevertheless, it is possible for the housing 10 to be disposed in other rotary planes, even a vertical plane.

Mounted upon the outer or upper face of the housing 10 is the compressor motor 15 with the motor shaft 16 vertically disposed within the housing 10 coaxially of the center, and rotary axis, of the housing 10.

Fixed to the motor shaft 16 is a compressor member, such as a wheel or disc 18, from the bottom surface of which are mounted depending vanes 19. As best disclosed in FIG. 4, these vanes 19 are disposed at angles to the radii of the disc in order to improve the centrifugal thrust of the compressor member 18 upon the refrigerant as the compressor wheel 18 is rotated in the direction of the arrow as indicated in FIG. 4. The compressor member 18 is contained in a compressor wheel chamber 20 defined by the partition wall 11 and a circular, inverted, dish-shaped wall or cowl 21. The periphery of the cowl 21 is attached to an annular extension wall 22 diverging upwardly from the partition wall 11 in order to provide a radial expansion passage for the compressed gases moving outwardly from the compressor wheel 18. The extension wall 22 is supported on the partition wall 11 by circumferentially spaced spacer members 23.

Also mounted within the compressor-condenser chamber 13 is a drum-shaped member having an annular upper wall 25 substantially parallel to the partition wall 11 and an outer annular end wall 26 extending between the upper wall 25 and the partition wall 11. The upper edge of the end wall 26 is fixed to the outer edge of the upper wall 25. However, the inner edge 27 of the upper wall 25 is circular and spaced from the cowl 21 in order to provide an annular fluid opening. The end wall 26 is spaced radially outwardly from the periphery of the extension wall 22, and the top wall 25 is spaced above the extension wall 22, in order to provide a continuous fluid passage from the compressor wheel chamber 20 radially outwardly, upwardly and then radially inwardly to the opening formed by the inner edge 27.

Fixed to the top of the top wall 25 are a plurality of circumferentially spaced radially extending, hollow, heat transfer ribs 29. As disclosed in the drawings, particularly FIGS. 2 and 3, the ribs 29 are inverted V-shaped and resemble a circumferential span of accordian pleats. Fixed to the tops of the transfer ribs 29 is an annular top cover plate 30. A very efficient heat transfer is effected between the compressed refrigerant passing between the bottom surfaces of the hollow ribs 29 and the top plate 25, and the air passing between the top surfaces of the ribs 29 and the cover plate 30. Thus, the spaced, V-shaped hollow ribs 29 form a very efficient condenser surface for the machine.

After the refrigerant is condensed in the hollow ribs 29, the condensed liquid is slung against the outer peripheral wall 32 of the compressor-condenser chamber 13 and is held in a collected pool 33, disclosed in FIG. 3, by the centrifugal force of the rotary housing 10.

In order to transfer the collected liquid refrigerant 33 from the compressor-condenser chamber 13 to the evaporator chamber 14, a plurality of circumferentially spaced weepholes 34 are formed through the periphery of the partition wall 11 adjacent the outer compressor chamber wall 32. The liquid refrigerant will then pass through the weephole 34 by gravity into evaporator chamber 14, where some of the liquid 36 will collect upon the interior surface of the outer peripheral wall 35 of the evaporator chamber. However, much of the liquid refrigerant will be pulled into the interior of the compressor chamber 14 because the pressure in the center of the evaporator chamber 14 is lower than at its periphery.

In order to overcome the molecular attraction of the liquid 36 to itself and the peripheral wall 35, a slinger member 38 comprising an elongated arm 39 and a scoop-like member or shoe 40 at its outer extremity is also mounted on the compressor motor shaft 16 to rotate therewith. The shoe 40 is spaced very close to the peripheral wall 35 so that as the shoe 40 rotates, it will pick up the collected liquid 36 without frictionally engaging the wall 35 and dissipate the refrigerant within the chamber 14 for more rapid evaporation.

The bottom wall of the evaporator chamber 14 is constructed in the same pleated shape as the condenser ribs 29 to form V-shaped, circumferentially spaced radially extending, hollow evaporator ribs 42. An annular bottom cover plate 43 is fixed to the bottom vertices of the V-shaped ribs 42 in order to form radially extending air passages between the outer surfaces of the ribs 42 and the cover plate 43 to effect heat transfer between the evaporating refrigerant and the conditioned air.

An enlarged circular opening 45 is formed concentrically in the center of the partition wall 11 in order to permit the return of the evaporated refrigerant from the evaporator chamber 14 into the compressor wheel chamber 20 where the refrigeration cycle is repeated. The opening 45 may be covered with a louvered member 46, or any other type device for eliminating the passage of any entrapped liquid with the gaseous refrigerant returning to the compressor chamber 20, if desired.

As best disclosed in FIG. 3, the motor shaft 16 extends downwardly through the compressor wheel chamber 20, the return opening 45 and the louvered member 46. The bottom of the shaft 16 is journaled for free rotation in a pilot bearing 48 fixed upon the upper surface of the drive block 49. The drive block 49 also supports a portion of the bottom wall of evaporator chamber 14.

As has been previously mentioned, both the compressor member 18 and the slinger member 38 are fixed to the motor shaft 16, so that both members rotate at the same speed and in the same direction when driven by the compressor motor 15.

The circumferential end wall 26 of the drum-shaped member is provided with a plurality of circumferentially spaced openings 51 to permit the passage of any compressed refrigerant which may condense prematurely, that is, before passing through the condenser ribs 29. Such condensed liquid passes directly from the compressor chamber 20 to collect against the outer wall 32 of the compressor-condenser chamber 13.

In order to rotate the refrigeration housing 10, the hub or drive block 49 is fixed to the motor shaft 53 of the drive motor 54 which is stationarily mounted upon a support, such as the floor 55 of a plenum housing 56. As previously mentioned, the motor shaft 53 is disposed vertically, so that the rotary plane of the refrigeration housing 10 is substantially horizontal.

At this point, it will be apparent that when the drive motor 54 is energized, not only will the entire refrigeration housing 10, with all its contents, be rotated in o horizontal plane at the rated speed of the drive motor 54, but the compressor motor 15 fixed to the refrigeration housing 10 will also be rotated at the same speed as the housing 10. Moreover, with both motors 54 and 15 energized, and connected to rotate in the same direction, the compressor wheel 18 will also be rotated within the compressor chamber 20 at a speed relative to the floor 55 equal to the sum of the speeds of the two motors 15 and 54.

Although there are numerous variations of uses and mounting constructions for this refrigeration machine, the plenum housing 56 has been disclosed in the drawings as one specific means of mounting the refrigeration machine for cooling air in the air conditioning of a room, for example. The partition wall 11 is shown having a diameter greater than the diameter of either the compressor-condenser chamber 13 or the evaporator chamber 14 in order to create a peripheral ledge or tongue which rotates within a circular track 58 formed by spaced apart plates 59 and 60. The plates 59 and 60 have vertically aligned circular openings for receiving and guiding the rotary movement of the housing 10. Moreover, the plates 59 and 60 together with the rotary refrigeration housing 10 constitute a substantially horizontal partition between the upper plenum chamber 61 and the lower plenum chamber 62 in the plenum housing 56.

With the drive motor 54 fixed to the floor 55 in any convenient manner, and the upper portion 16' of the motor shaft of the compressor motor 15 freely journaled within the upper pilot bearing 64 fixed in the top wall 65 of the plenum housing 56, the entire refrigeration machine is substantially stabilized and mounted for free rotary movement.

An outside air inlet 66 communicates with an air inlet chamber 67 surrounding the compressor motor 15. In the bottom of the inlet chamber 67 is a circular opening from which depends a cylindrical conduit 68 concentric with the rotary refrigeration housing 10. The inner circular edge of the cover plate 30 is provided with an upstanding cylindrical collar 69 adapted to fit within the conduit 68 in order to provide free rotatable movement of the collar 69 with the housing 10 within the cylindrical conduit 68, and yet close enough to provide an adequate air seal therebetween. An outside air outlet 70 is formed in the opposite wall of the housing 56 from the air inlet 66. Thus, as air is thrown outwardly between the condenser ribs 29 and the cover plate 30 by the centrifugal force of the rotating housing 10, additional air is drawn through the outside inlet 66, inlet chamber 67, cylindrical conduit 68 and collar 69. The heat of the condensing refrigerant is transferred to the outside air, passing radially of the hollow ribs 29, which is subsequently discharged through the outlet 70 at a higher temperature.

Below the partition wall 60, an inside air inlet 72 is formed in the wall of the plenum housing 56 through which air passes into the inside air inlet chamber 73 and then upward through a circular opening to an upstanding cylindrical conduit 74 concentric with the hub 49. The inner circular edge of the lower cover plate 43 is provided with a depending circular collar 75 rotatably fitted within the cylindrical conduit 74. Again, the fit between the collar 75 and the conduit 74 is such as to adequately seal the passage of air therebetween. Thus, the inside air is drawn through the inlet 72, inlet chamber 73, cylindrical conduit 74 and collar 75 by the low pressure vortex created of the rapidly rotating refrigeration housing 10. The air is then thrown radially outwardly between the radially extending evaporator ribs 42, where heat is transferred from the air through the evaporator ribs 42 to the refrigerant within the evaporator chamber 14. The air passing along the ribs 42 is discharged from the periphery of the of the rotary housing 10 and passes through the inside air outlet 77 at a reduced temperature.

It will thus be seen that the rotating housing 10, as it is particularly constructed, will assist in compressing and circulating the refrigerant, and also functions as a blower or fan for circulating air on both the condenser and evaporator sides of the housing 10.

The inside air inlet 72 and outlet 77 may be connected by conduits to a room or rooms or other space to be conditioned or cooled where the refrigeration machine is to be used as a centralized unit.

As disclosed in FIG. 3, drain connection 80 may be inserted in the bottom plenum housing wall 55 in order to eliminate condensation from the conditioned air in plenum chamber 62.

Since the compressor motor 15 rotates with the housing 10 when the machine is operating, electricity may be fed to the motor 15 through an electrical conduit within a hollow shaft extension 16', or electricity may be fed through appropriate commutator means.

Of course, because of the effective increase in speed of the compressor member 18 permitted by this refrigeration machine some of the parts may be made smaller than a single-motor centrifugal refrigeration machine. Consequently, this refrigeration machine could be made in a small enough package to air-condition a single room, and be mounted in an opening in the ceiling of the room so that the inlet 72 and outlet 77 are within the room to be conditioned, while the openings 66 and 70 are outside the room.

It will be further noted that in the particular design disclosed in the drawings, both motors 15 and 54 are located within the respective inlet chambers 67 and 73 and completely surrounded by moving air which will assist in cooling both motors.

It is therefore apparent that a centrifugal refrigeration machine has been developed which includes a two-stage compression in a single-stage package. Moreover, the design of this refrigeration machine permits twice the theoretical compressor speed as previously permitted by single-motor centrifugal compressors. By increasing the compressor speed, the compression of the refrigerant is increased, thus permitting substantially smaller equipment to produce the same refrigerating effect as in previously used, but larger, centrifugal refrigeration machines.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A centrifugal refrigeration machine comprising:
   (a) a hollow housing having a rotary axis,
   (b) refrigerant in said housing,
   (c) refrigerating cycle means within said housing including a closed circuit for said refrigerant and operative to condense said refrigerant on one side of said housing and to evaporate said refrigerant on another side of said housing,
   (d) said refrigerating cycle means including a rotary compressor member within said housing on said one side,
   (e) a compressor motor mounted on said housing and connected to said compressor member for driving said compressor member coaxially of said rotary axis and relative to said housing to compress said refrigerant, and
   (f) a drive motor connected to said housing to rotate said housing about said rotary axis.

2. The invention according to claim 1 in which said compressor member and asid housing are rotated in the same direction.

3. The invention according to claim 1 further comprising a partition within said housing substantially normal to said rotary axis and dividing said housing into a compressor-condenser chamber on said one side and an evaporator chamber on said other side, said closed circuit including means for transferring refrigerant through said partition.

4. The invention according to claim 3 further comprising a condenser surface on said one side, said circuit comprising means for conveying refrigerant from said compressor member past said condenser surface to the outer perimeter of said compressor-condenser chamber, said refrigerant transfer means comprising weepholes adjament said perimeter for transferring said condensed liquid refrigerant from said compressor-condenser chamber to said evaporator chamber, and a return opening adjacent said rotary axis to convey evaporated refrigerant from said evaporator chamber to said compressor-condenser chamber.

5. The invention according to claim 3 in which said compressor-condenser chamber has a condenser wall on said one side and said evaporator chamber has an evaporator wall on said other side, each of said condenser and evaporator walls comprising a plurality of circumferentially spaced, radially extending, hollow ribs, having inner surfaces and outer surfaces, said inner surfaces communicating with their respective compressor-condenser and evaporator chambers, and cover means associated with said ribs to form radially extending air passages between said ribs on said outer surfaces.

6. The invention according to claim 4 further comprising a rotary slinger member mounted in said evaporator chamber and operatively connected to said compressor motor for rotation therewith, the outer extremity of said slinger member having means adjacent the perimeter of said evaporator chamber for removing liquid refrigerant from the outer wall of said evaporator chamber and dissipating said refrigerant within said evaporator chamber for more rapid evaporation.

7. The invention according to claim 4 further comprising a warm air plenum, a cold air plenum and a wall separating said plenums, said rotary housing being circular, a circular opening in said wall for rotatably receiving said housing so that said partition and said wall are substantially coplanar, said condenser surface being located in said warm air plenum, and said evaporator chamber being located in said cold air plenum.

8. The invention according to claim 4 in which said housing is mounted to rotate in a substantially horizontal plane, said compressor chamber being located above said evaporator chamber so that said liquid refrigerant will gravitate through said weepholes into said evaporator chamber and the refrigerating effect will be substantially uniform throughout said housing.

9. The invention according to claim 8 in which said condenser surface is on top of said housing and comprises circumferentially spaced, hollow, radial ribs.

10. The invention according to claim 8 in which said evaporator chamber comprises an evaporator surface on the bottom of said housing, said evaporator surface including a plurality of circumferentially spaced, hollow, radial ribs.

References Cited

UNITED STATES PATENTS

| 921,118 | 5/1909 | Kasley | 103—98 |
| 1,446,727 | 2/1923 | Smith | 62—428 |
| 2,236,111 | 3/1941 | Philipp | 62—296 |
| 2,296,122 | 9/1942 | Squassoni | 62—499 |
| 2,680,007 | 6/1954 | Arbuckle | 165—34 |
| 3,044,685 | 7/1962 | Lapiken | 230—131 |

MEYER PERLIN, *Primary Examiner.*